US005719776A

United States Patent [19]

Haug

[11] Patent Number: 5,719,776

[45] Date of Patent: Feb. 17, 1998

[54] APPARATUS FOR DETERMINING A POSTAGE FEE

[75] Inventor: Werner Haug, Langnau, Switzerland

[73] Assignee: Frama AG, Lauperswil, Switzerland

[21] Appl. No.: 607,689

[22] Filed: Feb. 27, 1996

[30] Foreign Application Priority Data

Mar. 7, 1995 [CH] Switzerland ........................ 00653/95

[51] Int. Cl.[6] .............................. C07B 17/02; G06F 3/00

[52] U.S. Cl. ................................ 364/464.21; 364/709.1; 364/709.14

[58] Field of Search .................... 177/25.15; 364/464.02, 364/464.03, 466, 709.1, 709.14, 709.15, 464.12, 464.2, 464.21

[56] References Cited

U.S. PATENT DOCUMENTS

| | | | |
|---|---|---|---|
| 4,097,923 | 6/1978 | Eckert, Jr. et al. | 364/464.02 |
| 4,122,532 | 10/1978 | Dlugos et al. | 364/464.02 |
| 4,138,735 | 2/1979 | Allocca et al. | 364/464.02 |
| 4,286,325 | 8/1981 | Dlugos et al. | 364/464.03 |
| 4,325,440 | 4/1982 | Crowley et al. | 177/25.15 |
| 4,495,581 | 1/1985 | Piccione | 364/464.03 |
| 4,516,209 | 5/1985 | Scribner | 364/464.03 |
| 4,520,725 | 6/1985 | Haug | 101/91 |
| 4,595,984 | 6/1986 | Daniels | 364/466 |
| 4,739,701 | 4/1988 | Haug | 101/91 |
| 4,772,763 | 9/1988 | Garwin et al. | 178/18 |
| 4,788,623 | 11/1988 | Haug | 361/171 |
| 4,853,864 | 8/1989 | Hart et al. | 364/464.02 |
| 4,872,119 | 10/1989 | Kajimoto | 364/464.03 |
| 5,010,213 | 4/1991 | Moriwaki et al. | 178/18 |
| 5,157,616 | 10/1992 | Haug | 364/464.02 |
| 5,161,108 | 11/1992 | Haug | 364/464.02 |
| 5,189,732 | 2/1993 | Kondo | 395/155 |
| 5,191,533 | 3/1993 | Haug | 364/464.03 |
| 5,379,692 | 1/1995 | Haug | 101/227 |
| 5,384,484 | 1/1995 | Haug | 257/690 |
| 5,384,708 | 1/1995 | Collins et al. | 364/464.02 |
| 5,406,036 | 4/1995 | Haug | 177/25.15 |
| 5,490,077 | 2/1996 | Freytag | 364/464.02 |
| 5,509,117 | 4/1996 | Haug | 395/182.08 |
| 5,572,573 | 11/1996 | Sylvan et al. | 364/709.1 X |

FOREIGN PATENT DOCUMENTS 0135391 3/1985 European Pat. Off. .

*Primary Examiner*—Edward R. Cosimano
*Attorney, Agent, or Firm*—Ladas & Parry

[57] ABSTRACT

An apparatus for determining a postage fee for setting a postage meter. The apparatus includes a computer system with at least one memory for a computer program and a postage rate system. An input/display device for the computer system includes a transparent input plate having several input fields and covers a display. The number, arrangement and function of the input fields of the input/display device and their corresponding graphic display representation are variably controlled by a computer program adapting to desired inputs.

3 Claims, 11 Drawing Sheets

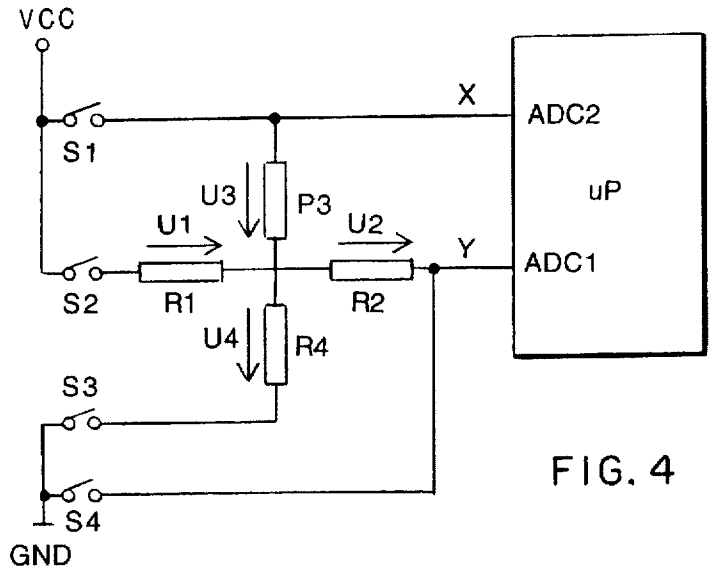
FIG. 4
FIG. 3
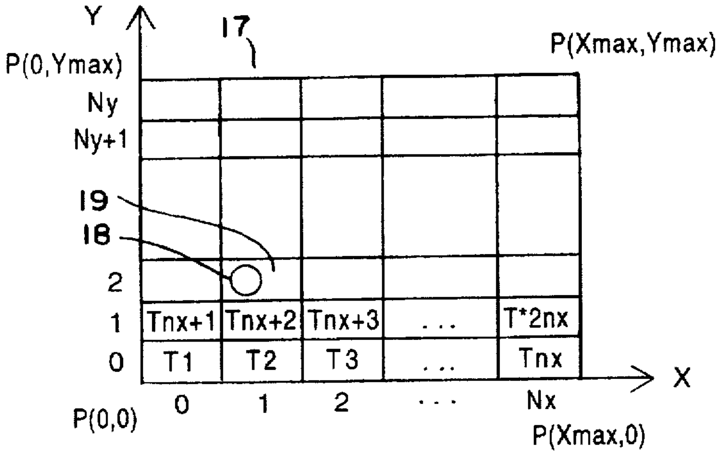
FIG. 5
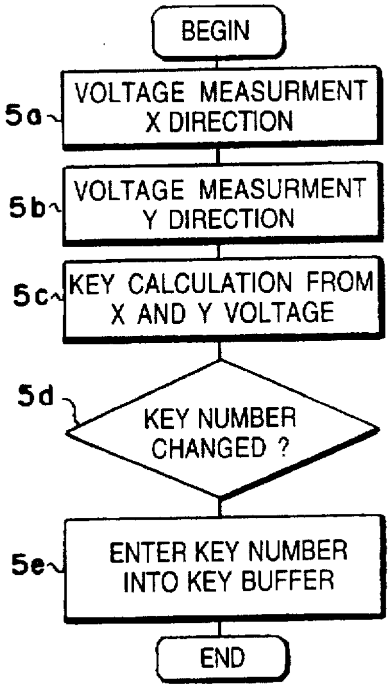

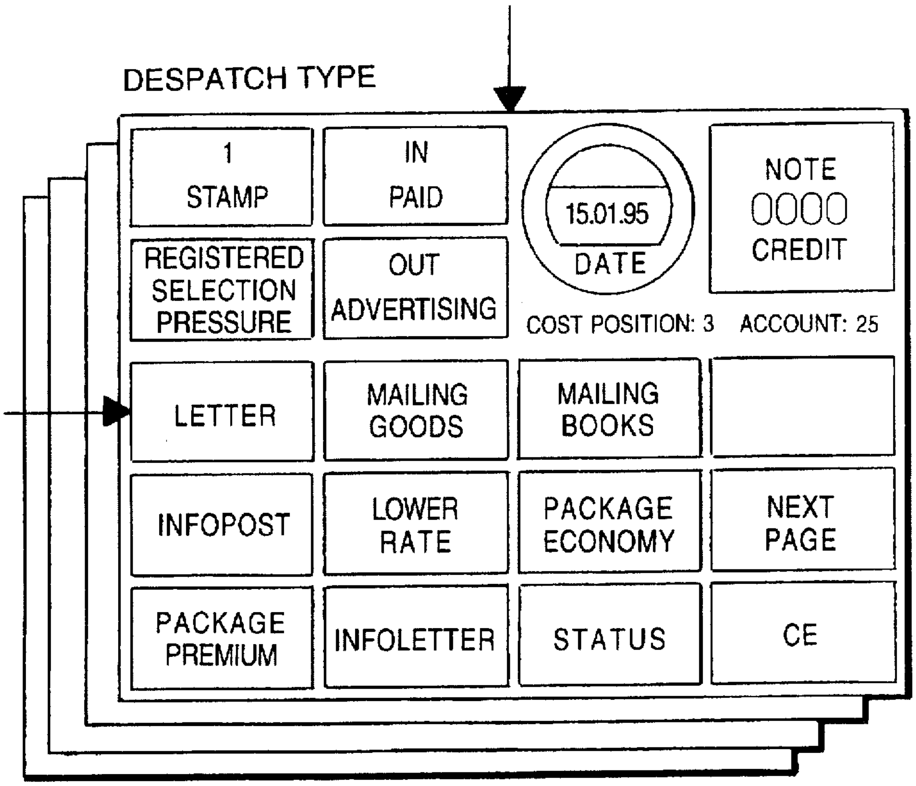
FIG. 12
FIG. 13
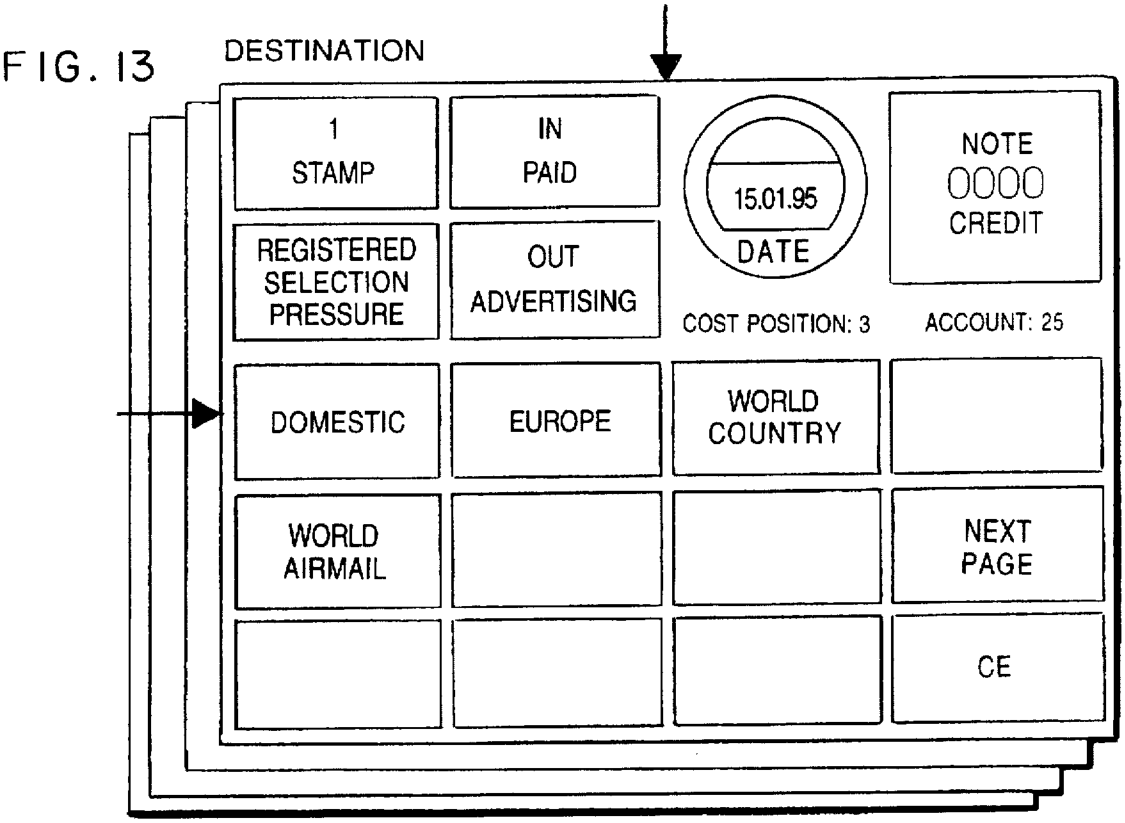

APPARATUS FOR DETERMINING A POSTAGE FEE

BACKGROUND OF THE INVENTION

The invention relates to an apparatus for determining a postage fee and for setting a postage meter, the apparatus including a computer, at least one memory for storing a computer program and data for a postal rate system, the apparatus further including a touch screen input/display device for inputting at least information concerning the weight, the dispatch destination and the dispatch mode of an article to be mailed and for displaying at least one postage fee determined on the basis of the information input.

In known apparatuses of this type, e.g., as a component of mail weighing scales combined with a rate calculator as described in U.S. Pat. Nos. 4,872,119 (Kajimoto), 4,516,209 (Scribner) and U.S. Pat. No. 4,495,581 (Piccione) or in a construction as a rate calculator according to U.S. Pat. No. 4,286,325 (Dlugos et at.) or European Patent EP-A-107 187 (Daniels) the input device has an input keyboard with numerous input keys arranged in fixed manner and which, apart from a decimal keyboard, has numerous keys arranged in a fixed manner for inputting information for determining the value or fee setting. In that case the display is positioned alongside the input keyboard and is constructed solely for representing a few pieces of information, such as a postage fee to be printed out by a postage meter or franking machine. The input device and the display associated therewith consequently take up a considerable part of the surface of the apparatus casing accessible for operating or control purposes. In addition, the input keyboard is complicated to manufacture, makes it more difficult to clean the surface of the apparatus, and can give rise to malfunctions or incorrect operation.

Further, the arrangement, number and function of the input keys of known apparatuses is dependent on the often complicated structure of a particular postage rate system. For example, devices described in Daniels, Dlugos et al. and Scribner illustrate that an input device, e.g., adapted to a U.S. rate system, in addition to the decimal keyboard, requires twenty input keys for the input of information. When using these numerous input keys it is necessary to seek from among twenty keys. As such, the operation is not simple despite the brief inscription provided for each key. This can be particularly troublesome for users who do not frequently utilize the apparatus.

As postage rates have very different compositions in individual countries and are also subject to changes from time to time, for the aforementioned known apparatuses a further disadvantage exists in that the manufacturer must provide a different input device or at least differently inscribed keys for any significant change in the rate structure or in order to adapt to the rate structure of each of the numerous countries having their own rate structure. This disadvantage is particularly problematical if the apparatus is to be a fixedly-installed component of a postage meter. In this case it would be necessary for the user to ensure that a service provider makes the change in a timely manner before any new postage rate comes into force. The very large number of postage meters in use can overburden the capacity of any customizing service which needs to be provided at short notice by a manufacturer.

In order to avoid having to utilize such customizing service providers to implement each rate change, U.S. Pat. No. 4,122,532 (Dlugos et al) and U.S. Pat. No. 4,138,735 (Allocca et at.) propose the adaptation of the content of the rate memory be carried out by data exchange with a central computer, which can take place with acoustic couplers (modem) via a telephone line or in wireless manner by means of a transmission and reception installation. A constructionally uncomplicated way of adapting to a modified postage rate system, which can be carried out particularly easily by the user is proposed in U.S. Pat. No. 5,406,036 (Hang). The advantage of a user-performable rate adaptation is, however, lost if there is a significant change in the rate structure, because this makes necessary the replacement of keys or the addition of further input keys.

U.S. Pat. No. 4,853,864 (Hart et al.) proposes the performing of the inputs necessary for determining a postage fee on a rate calculator by means of any one of the numerous, commercially available personal computers, e.g. an IBM XT.

Therefore, a need exits for a postage fee determining/postage meter apparatus which is of simple construction but permits an adaptation to a modified postage rate system or that of another country, so that the apparatus is useable on a worldwide basis. In addition, there is a further need for a design which is easy to operate and avoids the likelihood of errors resulting from the incorrect input of postage rates.

SUMMARY OF THE INVENTION

In accordance with a preferred embodiment of the present invention an apparatus is provided which includes an input/display device having a transparent input plate covering the display and responding to a manual input contact which generates input signals containing a corresponding local definition of the contact point, the number, arrangement and function of the adjustably definable input fields of the input plate, their corresponding graphic display being controlled by a computer program responsive to the manually provided input information. In this way, a command unit constructed in the manner of a touch screen input/display device, and by means of a computer program and in each case one program command, which is input by means of one of the input fields of a preceding menu or which is automatically predetermined on the basis of a clock, provides for a successively a large number of different, very simply constructed and correspondingly simply operable menus to be obtained, which follow one another in the manner of the Pages of a book.

In particular, it is possible to make the input fields very large, informative, easy to see and therefore operator-friendly, while placing the same on the available input plate surface.

A change to the design of the input fields and their arrangement in different representations of an input menu can take place in a simple manner with the setting up or changing of the postage rate by reading in a corresponding computer program, in that in the preferred embodiment of the invention the apparatus has a device for automatically changing the content of the memory for the postage rate system from outside the apparatus and the change can be input in wireless manner or by a rate charger connectable by means of a plug connection. Thus, even in the case of fundamental changes to the rate system or when adapting the apparatus for use in another country, it is not necessary to interchange the input/display device or individual input elements thereof and for this purpose call in a service provider. The easy changeability also makes it possible to add future improvements to the operational control and structure of the computer program on apparatuses or postage meters of the user.

As a result of much larger input fields than conventional input keys, when displaying their function by the display constructed, e.g., in the form of a liquid crystal display (LCD), the short designations hitherto necessary to be placed on the keys are avoided and a user guide can be provided, in much the same way as the user guide of a personal computer operating according to the window system. However, unlike in the latter, there is no need for a complicated control by means of a so-called mouse as the input/display device and the fundamental advantages of inputting by simply typing in the input field offered by the inscription located at the same place is maintained.

Preferably a larger area of the control or command unit is used for imaging the graphic representation to be produced on the article to be mailed, including the fee representation. This can be the graphic design of the postmark containing the fee indication established by the post office, together with an advertising slogan and a date.

BRIEF DESCRIPTION OF THE DRAWINGS

A preferred embodiment of the present invention is described in greater detail hereinbelow, including the accompanying drawings, wherein:

FIG. 3 is an exemplified matrix representation of the subdivision of the input/display device.

FIG. 4 is an electric circuit diagram of an embodiment of an input/display device.

FIG. 5 depicts a flow chart relative for the determination of the input fields of the input/display device.

FIG. 12 is an individual representation of a DISPATCH TYPE touch screen menu.

FIG. 13 is an individual representation of a DESTINATION touch screen menu.

DETAILED DESCRIPTION OF THE INVENTION

Figure 1:
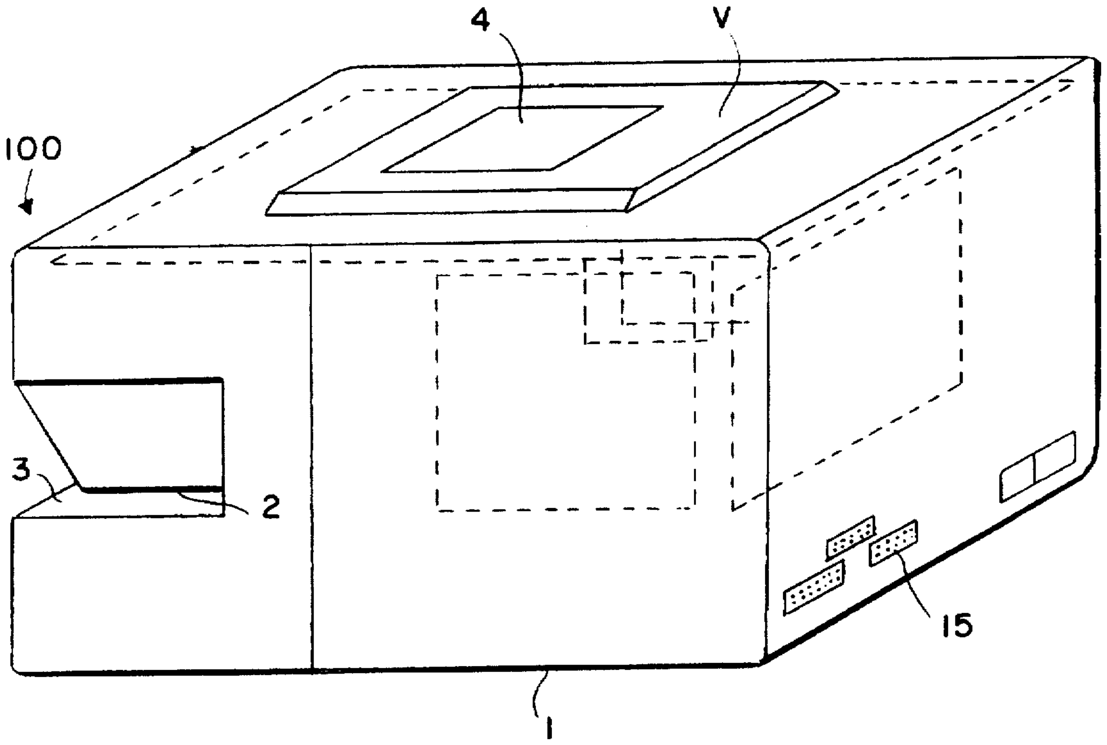
FIG. 1 is a perspective representation of a postage meter or franking machine with an apparatus according to the invention.
Figure 2:
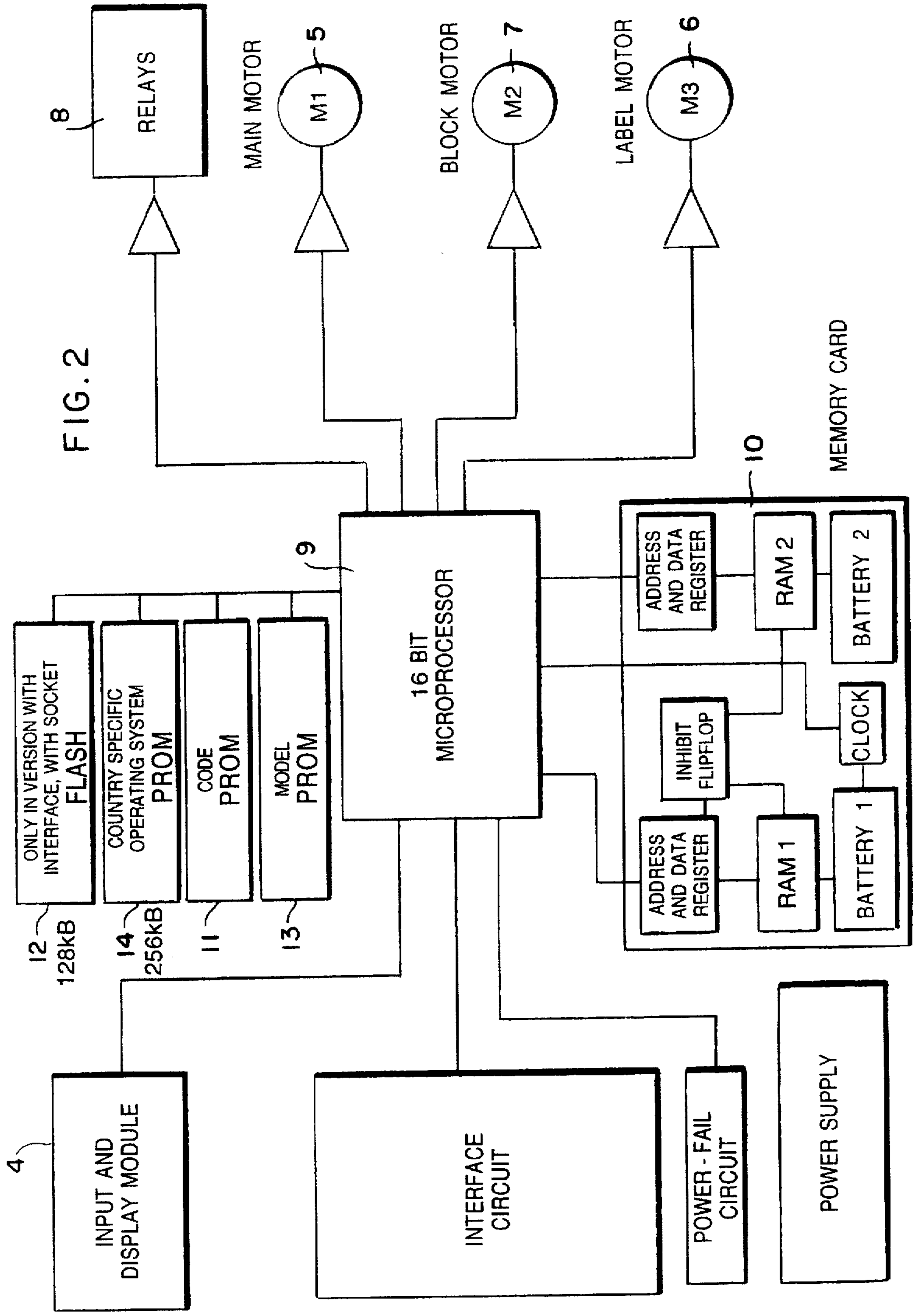
FIG. 2 is a general overview block diagram showing the electronic and mechanical components of the postage meter according to FIG. 1.

According to the embodiment shown in FIGS. 1 and 2, the apparatus V according to the invention for determining a postage fee is an integrated component of a postage meter or franking machine. For the operation of older postage meters in which a predetermined postage fee is input manually by means of a conventional keyboard, an apparatus V according to the invention constructed as an independent attachable unit can be advantageous. As an independent unit apparatus V can be located in a small casing, whose base surface need not be much larger than the comparable integrated input/display device 4.

A postage meter 100 having an apparatus V according to the invention can have a simply designed, relatively shallow casing 1, which for the insertion of envelopes to be franked or prepaid has on one side reception slit 2 open on three sides and with guideway 3.

After setting a postage fee on a print head enclosed in casing 1 and arranged above guideway 3 on the basis of the information input by means of input/display device 4, the insertion of an envelope into reception slit 2 brings about the operation of a trigger switch located on guideway 3. The trigger switch controls the switching in of main motor 5 indicated in FIG. 2 and consequently the transporting rolling of the print head onto the envelope The numerous possible mechanical and electronic functional sequences of a postage meter on the basis of the correspondingly numerous available information input possibilities are adequately described in the patent literature, so that a detailed description is unnecessary here. A mechanism enclosed in casing 1 together with motor 6 for conveying a randomly printable label strip is described in U.S. Pat. No. 5,379,692 (Haug). The function of motor 7 of the block diagram of FIG. 2 in the connection of additional printing devices on the print head of the postage meter can be understood from U.S. Pat. No. 4,739,701 (Haug). The mechanical setting of the type wheels of the print head for printing the value or fee and date on the basis of the electronic energizing of relays is described in U.S. Pat. No. 4,520,725 (Haug).

The postage values made available by the post office for numerous postal/franking operations is read into the memories RAM 1 and RAM 2 by a coded information exchange, said memories being fixed to memory card 10, which is specially protected against unauthorized access and the influences of faults. This coded information exchange can be performed as described in U.S. Pat. No. 5,157,616 (Haug). The code tables to be provided for this purpose are contained in replaceable memory 11. Memory card 10 can be enclosed in its own security casing enclosed in machine casing 1. An example for the implementation and security functions when replacing memory cards 10 is described in European Patent EP-A-560714 (Haug).

For increasing the security of memory card 10 has two separate memories RAM 1 and RAM 2 having address and data lines which cannot be tapped at the connector. The control signals for these memories RAM 1 and RAM 2 are obtained from an address coding and are therefore not inadmissibly influenceable from the outside. The component "inhibit-FF" of memory card 10 according to FIG. 2 ensures that for a memory access three release or enable accesses are required, i.e. two accesses to the address registers and one access to a particular data driver. The setting and resetting of the "inhibit-FF" taking place upon changing memory card 10 also takes place in a secured manner against inadmissible manipulations by means of the address decoding. On interrupting the supply voltage two voltage controllers inhibit the generation of operating signals (/WR) at the memories RAM 1 and RAM 2 and bring about a resetting of the central computer (CPU) 9. The batteries are used for the buffering of the memories RAM 1 and RAM 2.

Unlike in the approach described in Haug's European Patent EP-A-560714, in accordance with the embodiment of FIG. 2 central computer 9, for example, a typical 16 bit microprocessor, can be positioned outside the protected memory card 10 close to the control elements of the postage meter, so that by means of short, parallel paths it can control the entire mechanism of said meter and numerous plug connections to control elements of the meter are avoided.

The postage rate system is stored in a rate memory 12 constructed as a 128 kbyte FLASH memory. In addition, there are memories constructed in PROM "model" 13 and "country-specific operating system" 14, which contain a control and computer program adapted to a particular machine type. The replacement of memories 11 to 14 can take place in secure and simple manner, if constructed in accordance with U.S. Pat. No. 5,384,484 (Haug). It can also be particularly advantageous to carry out a change to the content of rate memory 12 and memories 13, 14 by a rate charger to be briefly connected for this purpose to the socket 15, shown in FIG. 1, from outside the postage meter, so that there is no need to call in a service provider and there is no need to open sealed casing 1. A detailed description of this known technology is provided in the '036 Hang U.S. patent.

In accordance with the invention below an input/display device 4 constructed as a transparent plate with an LCD display, so that the display provided by it reproduces the program controlled subdivision of the input provided into input fields 17, as seen in FIG. 3. Thus, the input apparatus formed from input/display device 4 and which is known from the literature as a touch screen, is located in a window-like opening on the top of casing 1.

The transparent plate of input/display device 4 e.g. has two coatings constructed as electric resistance surfaces, which are insulated electrically against one another by intermediate elements and whereof the upper one is bending-elastic. The electric resistance surfaces can be formed by a fine grid of parallel resistance wires. As seen in FIG. 3, at a random point 18, on which a slight pressure is exerted on the upper layer by a finger of the user, an electrically conductive contact is made between the resistance surfaces. A subdivision into partial resistors dividable in two directions X and Y and corresponding to this contact point it is possible to calculate the position of the point 18 in a X-Y coordinate system. The depiction in FIG. 3 shows a keyboard matrix with Nx keys in the X-direction and Ny keys in the Y-direction. The X and Y positions can be calculated in accordance with the following formulas:

$$Xpos = \frac{Nx}{Xmax} * Xmeas$$

$$Ypos = \frac{Ny}{Ymax} * Ymeas$$

where key no.=(Ypos * Nx)+Xpos+1.

Referring to FIG. 4, a current is initially only passed through one of the resistance surfaces, in that the switches S2 and S4 of the electric circuit are closed, whereas the switches S1 and S3 remain open. Along the particular current-carrying resistance surface there is a voltage drop, whose total value results from the difference of Vcc and GND. By measuring the partial voltage U2 at the contact point 18 its position in the current flow direction is determined. The measurement of U2 takes place by means of the other resistance surface electrically connected to the contact point or via the de-energized resistor R3 by an analog-digital converter ADC2 integrated into the computer 9. Through relating U2 to the total voltage Vcc-GND, the position of the contact point in direction X is known.

Subsequently current is passed through the other resistance surface, whilst the first-mentioned resistance surface remains deenergized For this purpose the switches S2 and S4 are opened and the switches S1 and S3 closed. Consequently the direction of the current differs from that of the preceding measurement by 90°. By measuring the partial voltage U4 across the deenergized resistor R2 the position of the contact point is correspondingly determined in the computer 9.

In a third calculation stage in accordance with the flow plan of FIG. 5, the computer 9 determines the number of an input field 19, as seen in FIG. 3, associated with the contact point, in that with the available surface of the input/display device 4 is randomly associated an imaginary grid pattern, e.g. corresponding to FIG. 3. The number of input fields 19 and therefore their size is freely selectable for the corresponding design of the computer program. If the number of input fields 19 in the X-direction is Nx and that in the Y-direction is Ny, the position of the input field and its number is calculated from the mathematical relationships given hereinabove in connection with FIG. 3. As seen in FIG. 5, voltage measurements are first taken in the X and Y directions (steps 5*a*, 5*b*). The key calculation is then made in accordance with the above referenced formulas (step 5*c*). A determination is then made as to whether a key number is changed (step 5*d*) and, if so, the key number is entered into the key buffer (step 5*e*).

Therefore a variable fixable input field 19 for the inputting of an information is functionally equivalent to the key switches of conventional, mechanically acting input keyboards, with the essential difference that the functional coverage and position of the input fields can also be selected by the user, as a function of which suitable computer and control programs are made available for a postage meter by means of the externally programmable memories 12 to 14.

The literature concerning input/display devices according to the touch screen principle shows that the signal generation can take place on the basis of different types of physical principles, but for a use according to the invention a particularly simply constructed system is suitable and preferred and reference should e.g. be made to the following patent literature: U.S. Pat. No. 5,189,732 (Kondo), U.S. Pat. No. 5,010,213 (Moriwaki et at.), European Patent EP-A-135 391 (Kilbourn) and European Patent EP-A-309 654 (Garwin).

Figure 6:
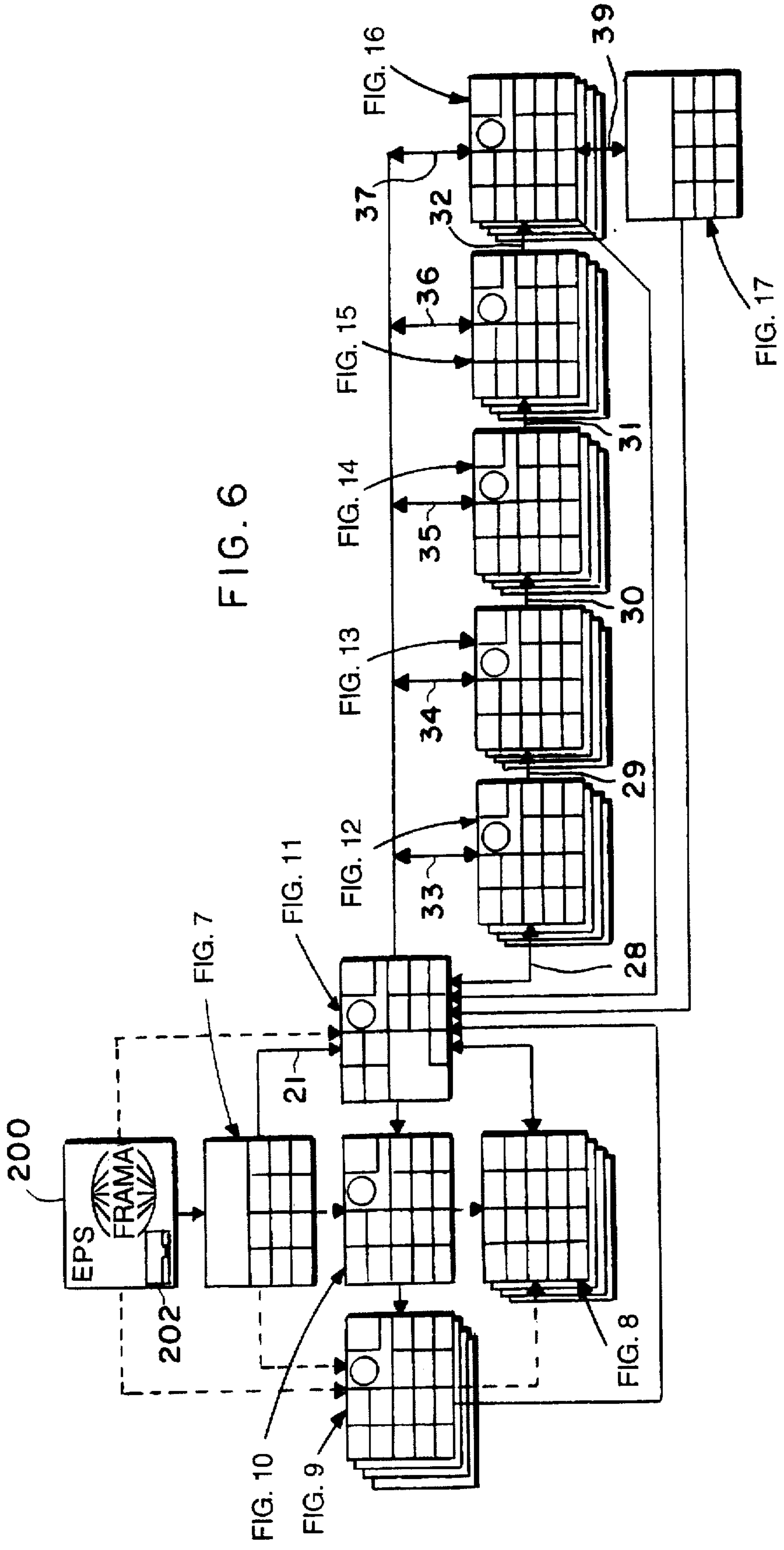
FIG. 6 shows an embodiment of the grouping of program-selectable touch screen menus of the input/display device.

FIGS. 7 to 17 show examples of callable, functional menus of input/display device 4 or for the subdivision and functional coverage of the input fields 19. The calling thereof can take place by operating a particular input field 19 or automatically by a clock. The menus of FIGS. 7 to 17 or their grouping in FIG. 6 illustrate that in a simple manner it is possible to choose between more than two input modes. The fee setting on the franking head of the prior art would be carried out on different postage meters.

The different, known input modes relate to the longest known direct inputting of the numerical amount by means of a decimal keyboard, e.g., according to U.S. Pat. No. 4,097, 923 (Eckert Jr., et al.), the inputting of fixed value amounts adapted to the postage rates by individual keys corresponding to U.S. Pat. No. 5,161,108 (Haug) and the inputting of weight values or weight stages adapted to the postage rate in addition to information concerning the desired dispatch mode according to European Patent Publication EP-A-387202 and U.S. Pat. No. 5,191,533 (Haug) for the calculation of the postage fee by means of a rate calculator. None of the known devices is suitable for the random use of all these input types or modes. Even if such a random use possibility of all the known prior art input types existed it would be difficult for a user to operate the device and the user would additionally have to refer to a guide in order to again learn the varying function of the fixed predetermined input keys.

According to the embodiment of the invention shown in FIG. 6, upon switching on the postage meter display 17, as seen in FIG. 3, there first appears an image 200 of the company mark "FRAMA" of the manufacturer and also in the left-hand, lower region 202 an indication of the value quantity still available for flanking purposes. Automatically there must then be a switching to a menu "pass word" according to FIG. 7. By means of this menu the particular user is requested to input by means of the imaged decimal keyboard an e.g. five-digit pass word. For additional security against unauthorized use it is also possible to provide electrically switching code keys, whereof in each case one is associated with each cost position of the postage meter or each authorized user thereof. This security procedure is disclosed in U.S. Pat. No. 4,788,623 (Haug). This is followed by the cost position "3" associated with the code or the user, as well as the account number 25, so that the value quantities used by him for franking purposes can be debited against this account. After changing to a "SYSTEM SETUP" menu according to FIG. 8, it is possible for the user to select another account number, so that he can randomly allocate to different accounts the franked mounts to be debited. For other users with a different pass word a larger number of further accounts is available.

Figure 11:
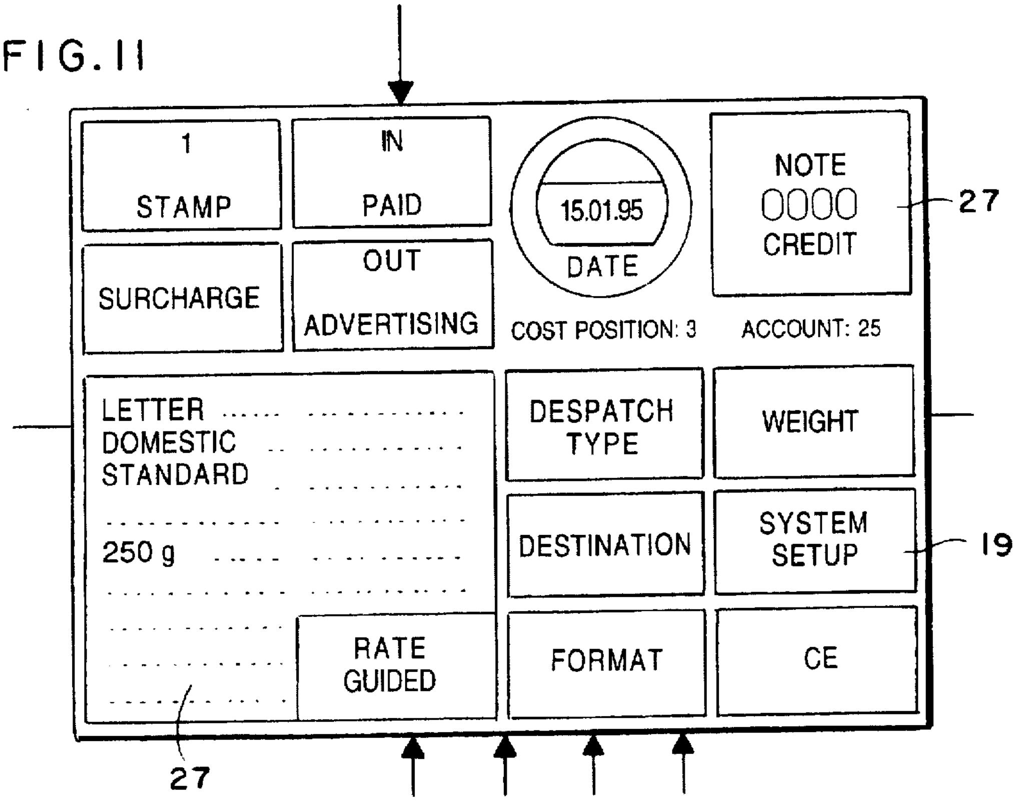
FIG. 11 is an individual representation of a RATE CALCULATING touch screen menu.
Figure 7:
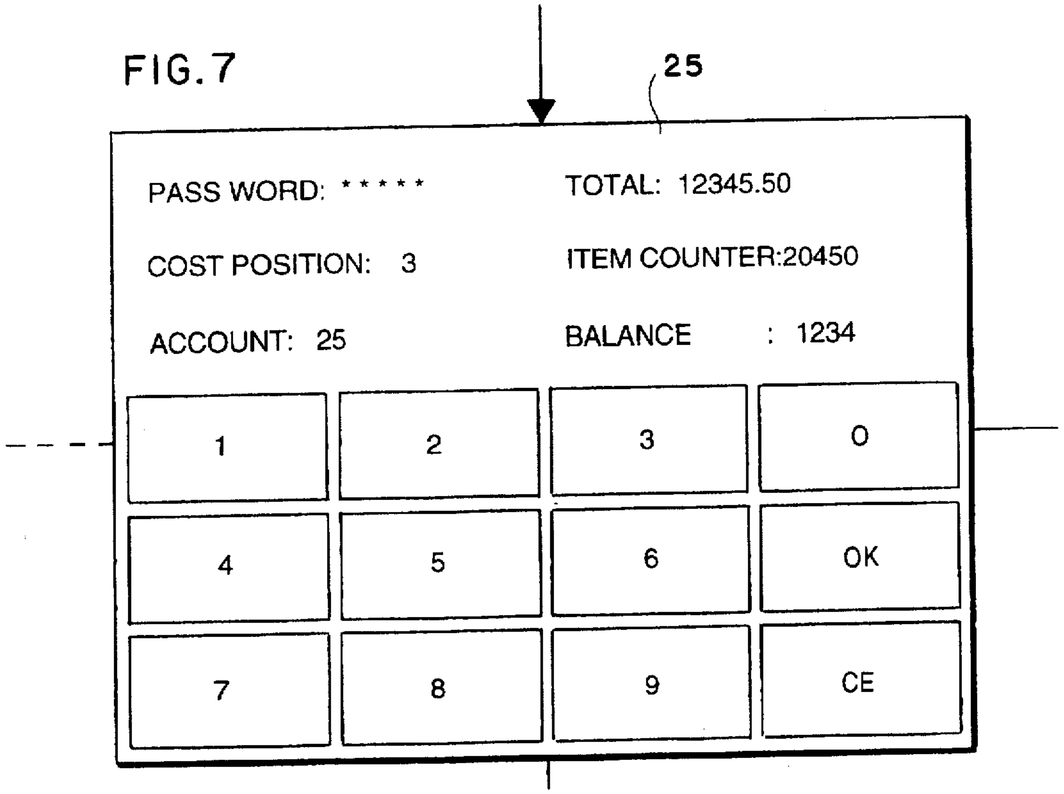
FIG. 7 is an individual representation of a PASSWORD touch screen menu.
Figure 8:
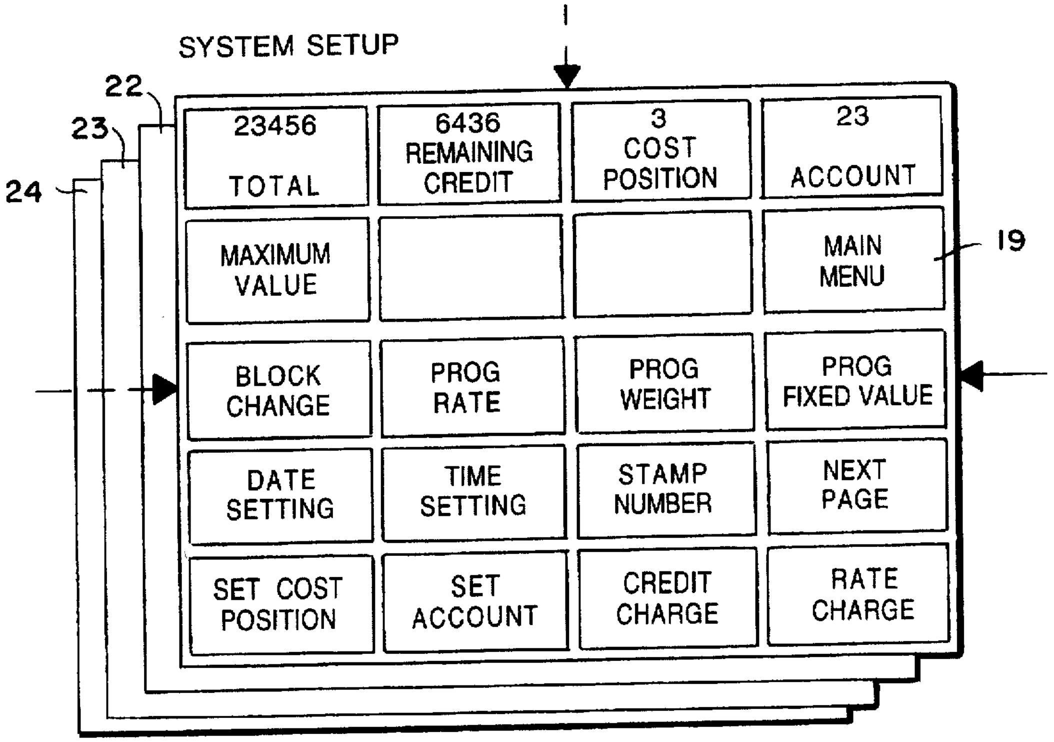
FIG. 8 is an individual representation of a SYSTEM SETUP touch screen menu.

After depressing the input field "OK" in the input menu according to FIG. 7, in accordance with process step indication line 21 of the menu structure of FIG. 6, there is a change to the main menu "rate calculating" according to FIG. 11. This main menu, like the main menus according to FIGS. 9 and 10, has an operating field "SYSTEM SETUP", which permits a further change in the "SYSTEM SETUP" menu according to FIG. 8.

Figure 9:
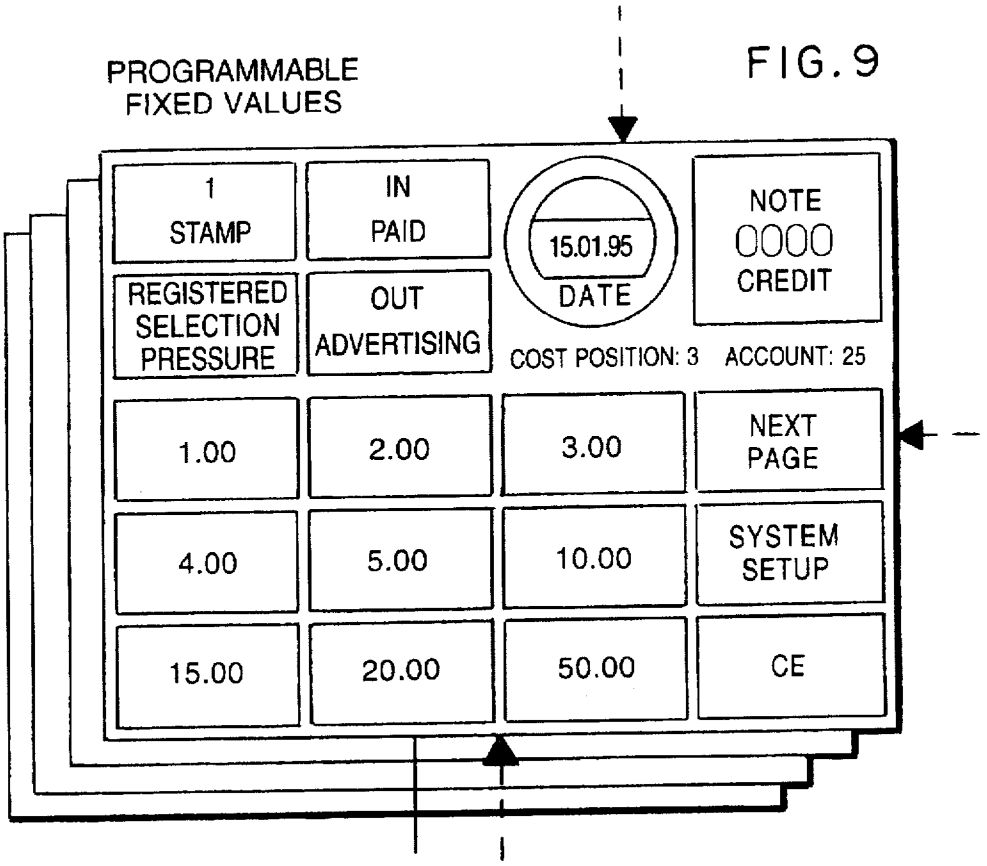
FIG. 9 is an individual representation of a PROGRAMMABLE FIXED VALUES touch screen menu.
Figure 10:
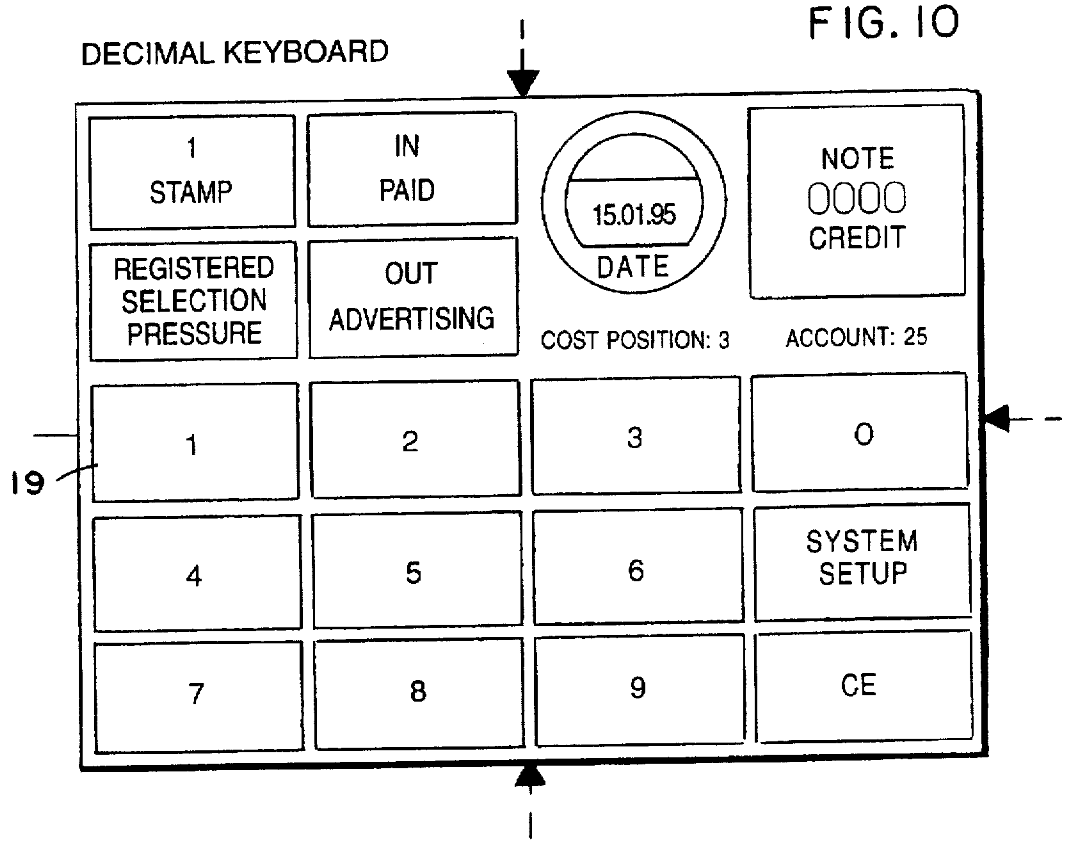
FIG. 10 is an individual representation of a DECIMAL KEYBOARD touch screen menu.
Figure 14:
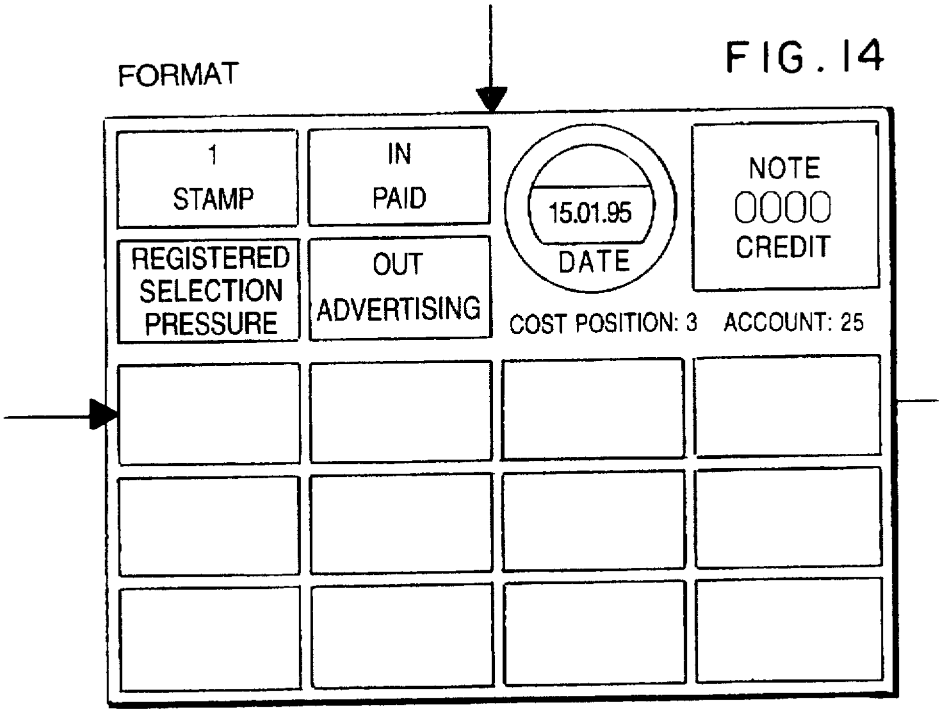
FIG. 14 is an individual representation of a FORMAT touch screen menu.
Figure 15:
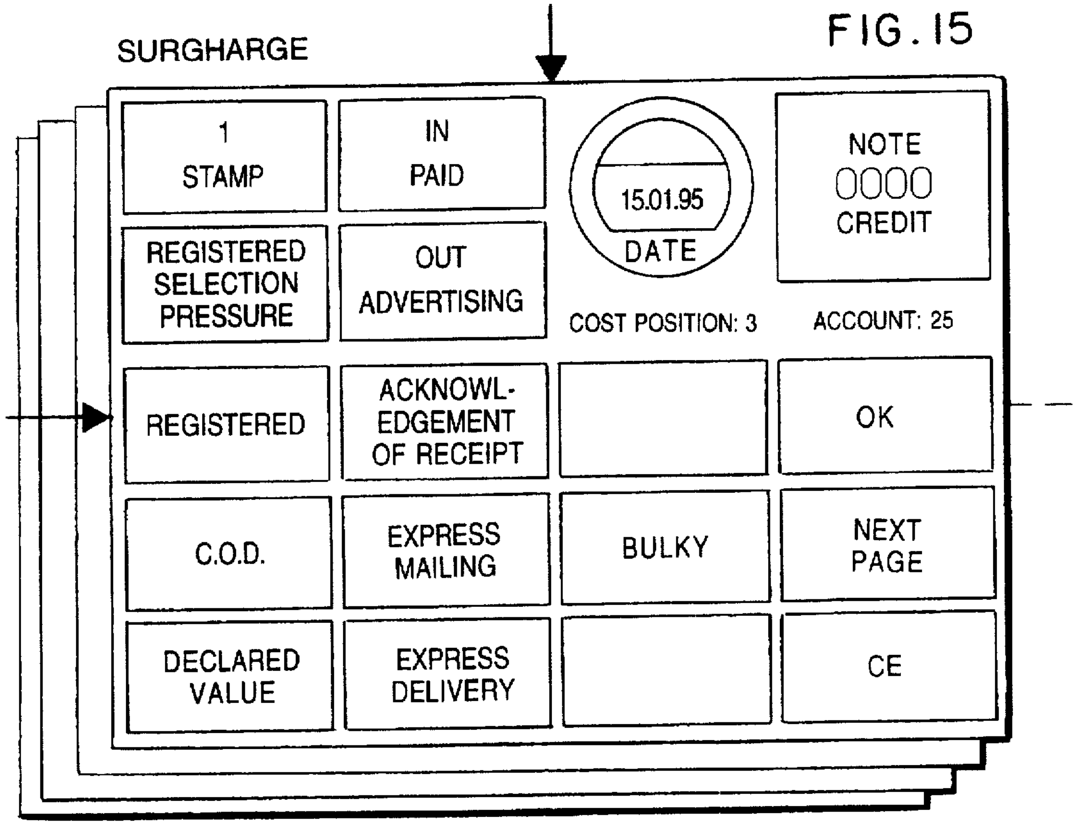
FIG. 15 is an individual representation of a SURCHARGE touch screen menu.

This "SYSTEM SETUP" menu permits a change to predetermined program settings of the postage meter and also a change to the main menus (FIGS. 9 to 11). If on the represented menu there is no input field 19 for the desired new setting with a particular inscription, then by pressing the input field "next page" a following page 22, 23 or 24 of this "SYSTEM SETUP" menu can be called which, like the pages of a book, follow one another until the sought input field 19 is found on one of the menu pages By pressing one of the input fields "PROG RATE", "PROG WEIGHT" or "PROG FIXED VALUE" in the "SYSTEM SETUP" menu a change can be made to one of the main menus according to FIGS. 9 to 11 and therefore a change to the input mode for the postage fee setting.

However, there can also be a direct change from the "pass word" menu according to FIG. 7 to the "SYSTEM SETUP" menu, in that in the "pass word" menu an input field 19 is provided, which e.g. corresponds to the entire size of the upper display area 25, so that there it is possible to depress a random point in order to bring about a menu change.

If there is to be no new setting by using the "SYSTEM SETUP" menu, then said change takes place of the "pass word" menu of FIG. 7 to the "rate calculating" menu according to FIG. 11. This menu has a basic setting "standard domestic 250 g letter" for the most frequently occurring value setting, as shown in the large, left-hand field 26 of the menu. By operating this input field 26, the initially electronically set postage fee in the memory is mechanically set on the postage meter head by energizing the particular relay 8 and also appears in the image 27 of the postmark.

For a setting of postage fees differing from the standard setting it is possible by pressing one or more times postmark image 27 of the input/display device 4 to change to one of the other main menus according to FIG. 10, in order to input the postage fee on the basis of the knowledge of the postage rate by the user and in a direct manner by means of the decimal keyboard like input fields 19 according to FIG. 10 or by means of the input fields for fixed numerical valises "1.00, 2.00, 3.00, etc." according to FIG. 9, or in the "rate calculating" menu according to FIG. 11 associated sub-menus are called, namely "dispatch type", "destination", "format", "surcharge" or "fixed weight" in accordance with the representations of FIGS. 12 to 17. This can be carried out automatically after pressing the operating field "rate guided". This leads to the automatic appearance of the sub-menu following the direction indicated by process step indication arrows 28 to 32, as soon as an input has been performed in the particular sub-menu called. The input performed is then given in the "rate calculating" written field 26 of the main menu. However, the sub-menus "dispatch type", "destination", "format", "surcharge" or "fixed weight" can be directly selected or called by correspondingly designated operating fields 19 of the "rate calculating" main menu, as indicated by process step indication arrows 33 to 37 in FIG. 6, with a resetting to the "rate calculating" main menu and display there in the written field 26.

If the called sub-menu has no input field 19 for the desired input, then by operating the input field "next page" it is possible to leaf through the particular sub-menu until a mode of the sub-menu appears which has the sought input field 19. The particular additional pages are shown in FIGS. 12, 13, 15 and 16 identically to the additional pages 22 to 24 of the "SYSTEM SETUP" menu of FIG. 8.

Figure 16:
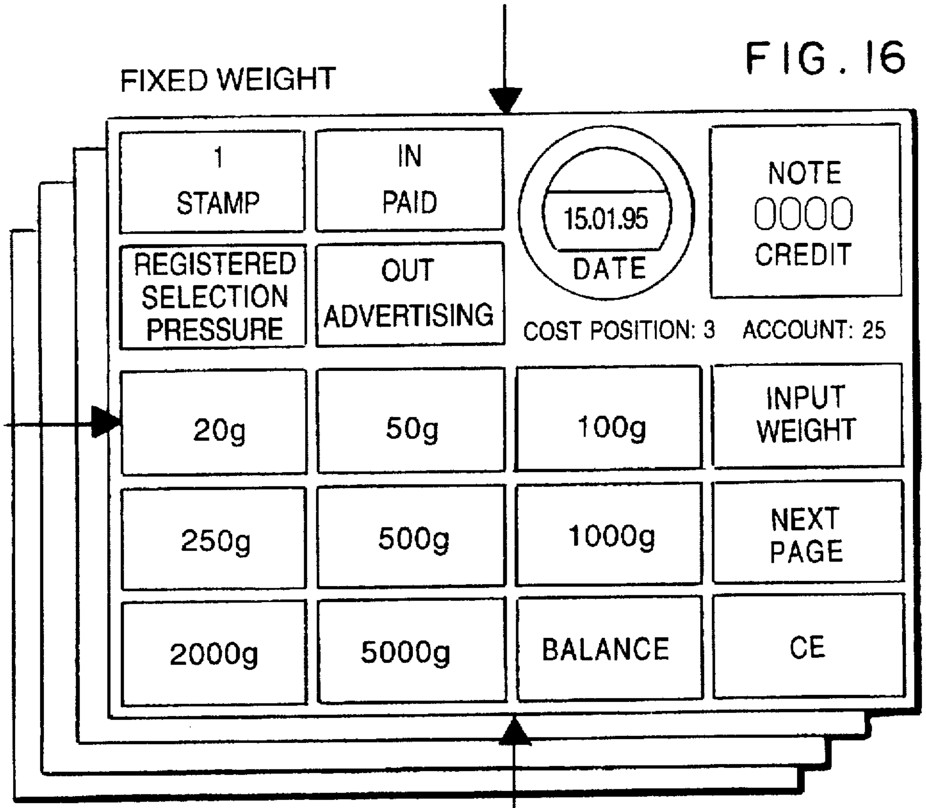
FIG. 16 is an individual representation of a FIXED WEIGHT touch screen menu.
Figure 17:
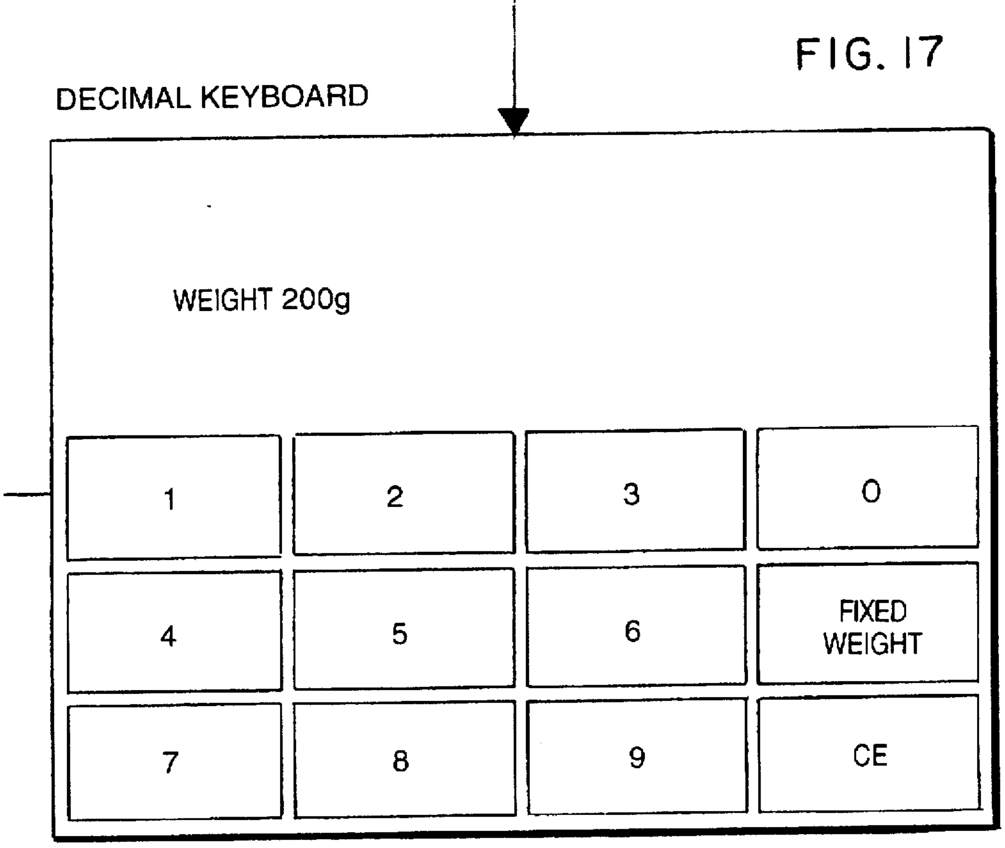
FIG. 17 is an individual representation of a DECIMAL KEYBOARD touch screen menu.

For a change to the input type according to the weight of the article to be mailed and franked, it is possible to switch backwards and forwards between the "fixed weight" sub-menu of FIG. 16 for inputting weight stages and a sub-menu for the direct inputting of the weight by means of a decimal keyboard according to FIG. 17, in accordance with the arrow 39 in FIG. 6, in that therein the input fields "input weight" (FIG. 16) or "fixed weight" (FIG. 17) are operated.

Figure 18:
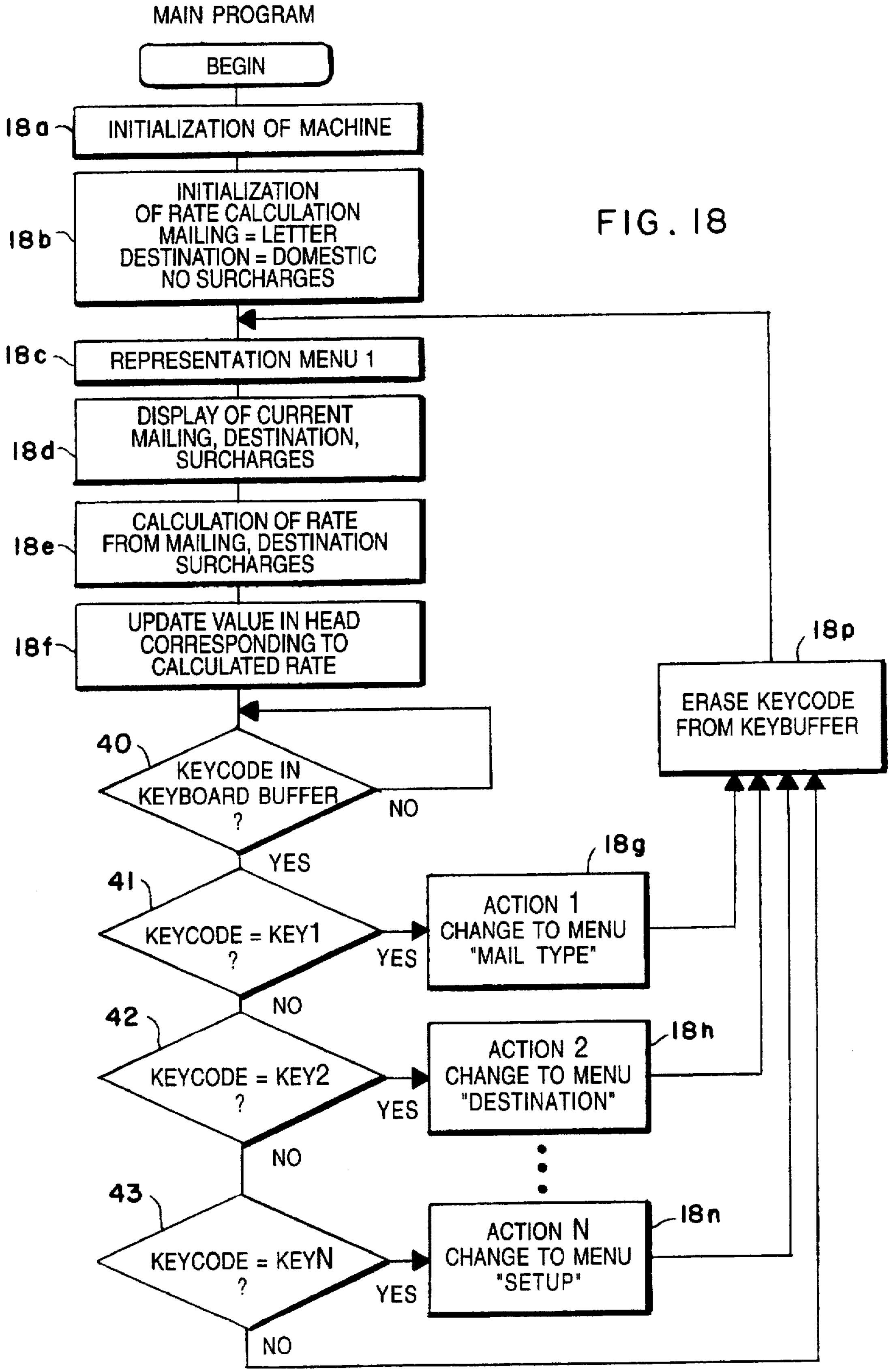
FIG. 18 shows a representation of the general program flow for the fee setting of the print head of a postage meter.

A simplified representation of the program sequence for the setting of a postage fee on the basis of an automatic setting of the "rate calculating" main menu according to FIG. 11 is given in FIG. 18. The inscriptions of the program fields give the essential functions taking place. The term "key" has been used in simplifying manner for the input fields 19, although the input/display device 14 has no real keys, but instead has variably fixable or erasable input fields 19 through the program-based X-Y distribution of the surface of the input/display device 4, 16 according to FIG. 4. Referring to FIG. 18, upon initialization of the machine (step 18*a*) the rate calculation is initialized (step 18*b*). A menu is provided (step 18*c*) displaying current mailing destination and surcharges (step 18*d*). Calculation of rate from mailing, destination and surcharges occurs (step 18*e*) providing an updated value corresponding to the calculated rate (step 18*f*).

Then, depending on key code entries (steps 40, 41, 42, 43) action is taken to appropriately change the menu (steps 18*g*, 18*h*, . . . 18*n*). The keycode is then appropriately erased from the keybuffer (step 18*p*).

Figure 19:
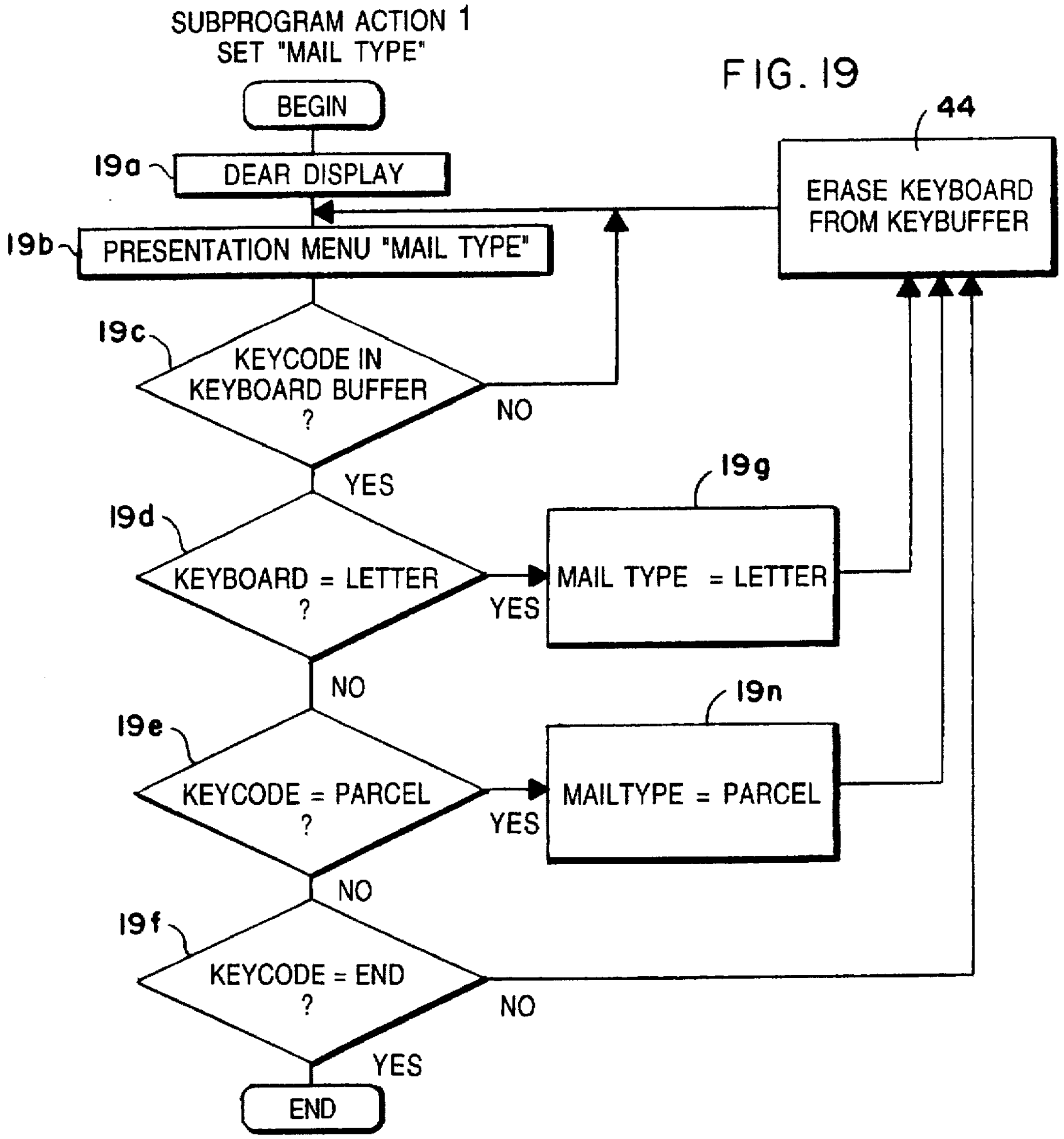
FIG. 19 is a flow chart of a subprogram relative to the program of FIG. 18.
Figure 20:
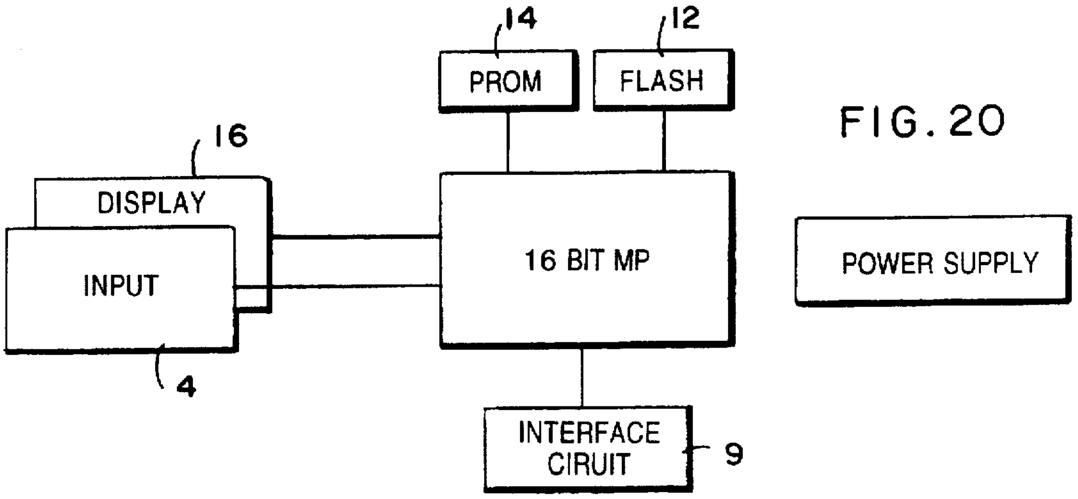
FIG. 20 shows a block diagram of the electronic components of an apparatus constructed as an independent unit.

On changing the setting, diverging from the standard setting described by means of FIG. 11, polling according to the program fields 40 to 43 (as seen in FIG. 98) establishes whether a particular input field 19 has been operated. For this purpose is provided a key code fixed on the basis of the calculation according to FIG. 5. If there is no key code in the key buffer, then the program sequence remains on the program field 10 and the set postage fee remains unchanged. A key code of a key 1 e.g. brings about a change to the "dispatch mode" sub-menu according to FIG. 12, whose program sequence is shown in FIG. 19. According to this subprogram polling also takes place as to which input field "letter", "package", etc. has been operated in order to optionally perform a calculation in the computer 9 corresponding to the rate program and then in accordance with the program field 44 erase the particular key code in the key buffer and update the display of the input/display device 4, 16. Referring to FIG. 19, after the subprogram begins the display is cleared (step 19*a*) and "mail type" menu is presented (step 19*b*). Upon a keycode decision (steps 19*c*, 19*d*, 19*e*, 19*f*) appropriate mail type is determined (steps 19*g* . . . 19*n*), whereupon the keycode is erased from the keybuffer (step 44).

The numerous European and U.S. patents referenced above are each hereby incorporated by reference to the extent needed by one reasonably skilled in the art to understand and practice the invention as claimed herein.

What is claimed is:

1. An apparatus for determining a postage fee for setting a postage meter, comprising a computer, at least one memory for a compute program and for a postal rate system, an input/display device for inputting at least information concerning the weight, the dispatch destination and the dispatch mode of an article to be mailed and with a display, located in the vicinity of the input/display device, for displaying at least one postage fee determined on the basis of these inputs, wherein the input/display device has a transparent input plate, which covers the display and responds to a locally defined, manual contact for the purpose of generating input signals, which contain a corresponding local definition of the contact points, the number, arrangement and function of the adjustably definable input fields of the input plate and their corresponding and correspondingly arranged graphic representation on the display is controlled by the computer program and is variable on the basis of input information, wherein for a main menu for the direct input of the value quantity to be printed there are input fields in the manner of a decimal keyboard and according to another input mode input fields for the stepwise predetermined fixed value amounts.

2. An apparatus for determining a postage fee for setting a postage meter, comprising a computer, at least one memory for a compute program and for a postal rate system, an input/display device for inputting at least information concerning the weight, the dispatch destination and the dispatch mode of an article to be mailed and with a display, located in the vicinity of the input/display device, for displaying at least one postage fee determined on the basis of these inputs, wherein the input/display device has a transparent input plate, which covers the display and responds to a locally defined, manual contact for the purpose of generating input signals, which contain a corresponding local definition of the contact points, the number, arrangement and function of the adjustably definable input fields of the input plate and their corresponding and correspondingly arranged graphic representation on the display is controlled by the computer program and is variable on the basis of input information, wherein in addition to the input fields, the display also reproduces the graphic representation to be produced on the article to be mailed.

3. The apparatus according to claim 2, wherein also the area of the input plate, which is defined by the reproduction of the graphic representation to be produced on the display, acts as an input field.

* * * * *